United States Patent [19]
Liu et al.

[11] Patent Number: 4,464,512
[45] Date of Patent: * Aug. 7, 1984

[54] COMPOSITION COMPRISING AN AROMATIC POLYESTER-CARBONATE RESIN AND A LINEAR LOW DENSITY POLYOLEFIN POLYMER

[75] Inventors: Ping Y. Liu, Naperville, Ill.; Kenneth F. Miller, Mt. Vernon, Ind.

[73] Assignee: General Electric Company, Mt. Vernon, Ind.

[*] Notice: The portion of the term of this patent subsequent to Aug. 30, 2000 has been disclaimed.

[21] Appl. No.: 510,597

[22] Filed: Jul. 5, 1983

Related U.S. Application Data

[63] Continuation-in-part of Ser. No. 343,950, Jan. 29, 1982, Pat. No. 4,401,785.

[51] Int. Cl.$^3$ .................................................. C08G 63/64
[52] U.S. Cl. ........................................ 525/146; 524/508
[58] Field of Search .......................... 524/508; 525/146

[56] References Cited

U.S. PATENT DOCUMENTS

| | | | |
|---|---|---|---|
| 3,477,978 | 11/1969 | Holub et al. | 525/146 |
| 3,654,219 | 4/1972 | Boyer et al. | 525/146 |
| 4,145,373 | 3/1979 | Baron et al. | 525/146 |
| 4,245,058 | 1/1981 | Liu | 525/146 |
| 4,401,785 | 8/1983 | Liu et al. | 524/508 |

FOREIGN PATENT DOCUMENTS

| | | | |
|---|---|---|---|
| 705481 | 11/1962 | Canada | 525/146 |
| 705482 | 11/1962 | Canada | 525/146 |
| 879152 | 8/1971 | Canada . | |
| 4645 | 10/1979 | European Pat. Off. . | |
| 1495674 | 4/1969 | Fed. Rep. of Germany | 525/146 |
| 46-40774 | 12/1971 | Japan | 525/146 |
| 46-40775 | 12/1971 | Japan | 525/146 |
| 98753 | 2/1965 | United Kingdom | 525/146 |
| WO80/83 | 1/1980 | PCT Int'l Appl. . | |

OTHER PUBLICATIONS

Chem. Abs. 95-62962k, 3/81, Tacke et al., (Bayer).
Research Disclos. 8/81, 20801, "Polycarbonate Blends with Improved Thickness".

*Primary Examiner*—Herbert J. Lilling
*Attorney, Agent, or Firm*—Martin B. Barancik

[57] ABSTRACT

Novel thermoplastic molding compositions that are stabilized against hydrolytic degradation comprising an aromatic polyester-carbonate resin and a linear low density polyolefin resin having a density of about 0.89 to 0.96 gm/cc.

9 Claims, No Drawings

COMPOSITION COMPRISING AN AROMATIC POLYESTER-CARBONATE RESIN AND A LINEAR LOW DENSITY POLYOLEFIN POLYMER

This application is a continuation-in-part of copending application Ser. No. 343,950, filed 1/29/82, now U.S. Pat. No. 4,401,785.

BACKGROUND OF THE INVENTION

Polyester-carbonates are well known high molecular weight thermoplastic materials which exhibit many advantageous properties. These properties render the polyester-carbonate resins useful as high performance engineering thermoplastics.

The polyester-carbonates are known to be susceptible to degradation under extreme heat and moisture which causes a reduction in properties including impact strength and appearance. This problem tends to reduce the use of these materials in applications where heat and moisture are present. The applicants have found that the addition of a minor amount of a linear low density polyolefin to a polyester-carbonate will result in a molding composition that will substantially maintain the impact strength of the polyester-carbonate when the composition is subjected to heat and moisture. This improved performance property has been demonstrated by tensile impact tests and unnotched impact tests after exposure to 82° C. water and superheated steam.

The increased stability is achieved without substantially depressing the heat distortion temperature of the polyester-carbonate resin. This is an advantageous result which makes the use of the linear low density polyolefins in combination with polyester-carbonate resins very attractive.

DETAILED DESCRIPTION OF THE INVENTION

The invention provides novel thermoplastic molding compositions that are stabilized against hydrolytic degradation. These compositions comprise:

(a) an aromatic polyester-carbonate resin; and
(b) a linear low density polyolefin resin having a density of about 0.89 to 0.96 gm./cc.

The preparation of polyester-carbonates which may be employed in the compositions of the present invention is described in U.S. Pat. Nos. 3,030,331; 3,169,121; 3,207,814; 4,194,038 and 4,156,069, as well as in copending application Ser. No. 33,389 filed Apr. 26, 1978 and assigned to the same assignee as the instant application, all of which are incorporated herein by reference.

The polyester-carbonates can generally be described as copolyesters containing carbonate groups, carboxylate groups and aromatic carbocyclic groups in the polymer chain, in which at least some of the carboxylate groups and at least some of the carbonate groups are bonded directly to ring carbon atoms of the aromatic carbocyclic groups. These polyester-carbonates are, in general, prepared by reacting a difunctional carboxylic acid or a reactive derivative of the acid such as the acid dihalide, a dihydric phenol and a carbonate precursor.

The dihydric phenols useful in formulating the polyester-carbonates useful in the compositions of the present invention are in general represented by the general formula:

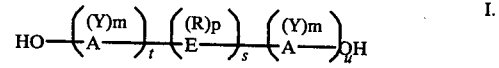

in which A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon containing linkage, or by a sulfur containing linkage such as a sulfide, sulfoxide, sulfone, etc. In addition, E may be a cycloaliphatic group (e.g., cyclopentyl, cyclohexyl, etc.); a sulfur containing linkage such as sulfide, sulfoxide or sulfone; an ether linkage or a carbonyl group. The symbol R in Formula I represents hydrogen or a monovalent hydrocarbon group such as alkyl (e.g., methyl, ethyl, propyl, etc.), aryl (e.g., phenyl, naphthyl, etc.), aralkyl (e.g., benzyl, ethylphenyl, etc.), alkaryl, or a cycloaliphatic group (e.g., cyclopentyl, cyclohexyl, etc.). Y may be an inorganic atom such as halogen (fluorine, chlorine, bromine, iodine), an inorganic group such as the nitro group, an organic group such as R is the same as defined herein above in Formula I, or an oxy group such as OR wherein R is as defined herein, it being only necessary that Y be inert to and unaffected by the reactants and the reaction conditions. The letter m represents any integer from and including zero through the number of positions on A available for substitution; p represents an integer from and including zero through the number of positions on E available for substitution; t represents an integer equal to at least one; s is either zero or one; and u represents an integer including zero or one.

In the dihydric phenol compound represented by Formula I above, when more than one Y substituent is present, they may be the same or different. The same holds true for the R substituent. Where s is zero in Formula I and u is not zero, the aromatic rings are joined with no intervening alkylene or other bridge. The positions of the hydroxyl groups and Y on the aromatic nuclear residues A can be varied in the ortho, meta or para positions and the groupings can be in a vicinal, asymmetrical or symmetrical relationship, where two or more ring carbon atoms of the aromatic hydrocarbon residue are substituted with Y and a hydroxyl group.

Some nonlimiting examples of compounds falling within the scope of Formula I include:
2,2-bis(4-hydroxyphenyl)propane (bisphenol A);
2,4′-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,1-bis(4-hydroxy-2-chlorophenyl)ethane;
2,2-bis(3-phenyl-4-hydroxyphenyl)propane;
bis(4-hydroxyphenyl)cyclomethane; and
2,2-bis(4-hydroxyphenyl)-1-phenylpropane.

These dihydric phenols may be used individually or as mixtures of two or more different dihydric phenols.

In general any difunctional carboxylic acid, or its reactive derivative such as the acid halide, conventionally used in the preparation of polyesters may be used for the preparation of polyester-carbonates useful in formulating the compositions of the present invention. In general the carboxylic acids which may be used include the aliphatic carboxylic acids, aliphatic-aromatic carboxylic acids, or aromatic carboxylic acids. The aromatic dicarboxylic acids or their reactive derivatives such as the aromatic diacid halides are preferred as they produce the aromatic polyester-carbonates which are most useful, from the standpoint of physical properties, in the practice of the instant invention.

These carboxylic acids may be represented by the general formula:

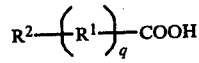

$$R^2 - (R^1)_q - COOH$$

wherein $R^1$ represents an alkylene, alkylidene or cycloaliphatic group in the same manner as set out above for E in Formula I; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by E in Formula I; or a divalent aliphatic-aromatic hydrocarbon radical such as an aralkyl or alkaryl radical. $R^2$ is either a carboxyl or a hydroxyl group. The letter q represents the integer one where $R^2$ is a hydroxyl group and either zero or one where $R^2$ is a carboxyl group. Thus the difunctional carboxylic acid will either be a monohydroxy monocarboxylic acid or a dicarboxylic acid. For purposes of the present invention the aromatic dicarboxylic acids or their reactive derivatives such as, for example, the acid dihalides, are preferred. Thus in these preferred aromatic dicarboxylic acids, as represented by Formula II, $R^2$ is a carboxyl group and $R^1$ is an aromatic radical such as phenylene, biphenylene, naphthylene, substituted phenylene, etc., two or more aromatic groups connected through non-aromatic linkages; or a divalent aliphatic-aromatic radical. Some non-limiting examples of suitable preferred aromatic dicarboxylic acids which may be used in preparing the polyester-carbonate resins of the instant invention include phthalic acid, isophthalic acid, terephthalic acid, homophthalic acid, o-, m-, and p-phenylenediacetic acid, the polynuclear aromatic acids such as diphenic acid, and 1,4-naphthalic acid.

These acids may be used individually or as mixtures of two or more different acids.

The carbonate precursor may be either a carbonyl halide, a carbonate ester, or a haloformate. The carbonyl halides which can be employed herein are carbonyl chloride and carbonyl bromide. Typical of the carbonate esters which may be employed herein are diphenyl carbonate, di(halophenyl)carbonates such as di(chlorophenyl)carbonate, di(bromophenyl)carbonate, di(trichlorophenyl)carbonate, di(tribromophenyl) carbonate, etc., di(alkylphenyl)carbonates such as di(tolyl)carbonate, etc., di(naphthyl)carbonate, di(chloronaphthyl)carbonate, phenyltolyl carbonate, chloronaphthyl chlorophenyl carbonate, and the like. The haloformates suitable for use herein include bishaloformates of dihydric phenols such as bischloroformates of hydroquinone, etc. or glycols such as bishaloformates of ethylene glycol, neopentyl glycol, polyethylene glycol, etc. While other carbonate precursors will occur to those skilled in the art, carbonyl chloride, also known as phosgene is preferred.

The polyester-carbonates which are useful in the practice of the present invention include the aromatic polyester-carbonates derived from dihydric phenols, aromatic dicarboxylic acids or their reactive derivatives such as the aromatic diacid halides, and phosgene. A quite useful class of aromatic polyester-carbonates is that derived from bisphenol A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of dihydroxydiaryl units to benzene dicarboxylate units to carbonate units can range from 1:0.25–0.9:0.75–0.1 preferably from about 1:0.6–0.85:0.4–0.15 and the molar ratio of terephthalate units to isophthalate units can range from about 9:1 to about 0.2:9.8 or essentially all of the units may be isophthalate or terephthalate units. The ester units are preferably all isophthalate or isophthalate with small quantities of terephthalate.

The linear low density polyolefins that may be utilized in the practice of the invention are well known materials which are exemplified by linear low density polyethylene (LLDPE). These polymers may be prepared from state of the art polymerization processes such as those described in U.S. Pat. No. 4,076,698 and Eur. Pat. Appl. No. 4,645, both of which are incorporated by reference. These polymers have a density between about 0.89 and about 0.96 gms/cc and a controlled concentration of simple side chain branching which distinguishes them from polymers such as high pressure low density polyethylene and high density polyethylene made from a Ziegler catalyst system. The preferred range of density is from 0.915 to 0.945 gms/cc. The LLDPE polymers are actually copolymers of ethylene with one or more alpha olefins of $C_3$ to $C_{18}$, preferably $C_3$ to $C_{10}$, and more preferably $C_4$ to $C_8$. The alpha olefins should not contain any branching in any of their carbons which is closer than the fourth carbon atom to the terminal carbon atom participating in the unsaturation. From 1 to 10 mol % of the alpha olefin may be used or more preferably from 2 to 7 mol % may be used.

The preferred LLDPE copolymers may be made from ethylene and one or more alpha olefins selected from the group consisting of propylene, butene-1, heptene-1, 4-methyl pentene-1 and octene-1, most preferably butene-1. These preferred copolymers have a melt flow ratio to $\geq 22$ to $\leq 32$ and preferably $\geq 25$ to $\leq 30$. The melt flow ratio of these preferred copolymers is another means of indicating the molecular weight distribution of a polymer. The melt flow ratio (MFR) range of $\geq 22$ to $\leq 32$ thus corresponds to a Mw/Mn value of about 2.7 to 4.1 and the MFR range of $\geq 25$ to $\leq 30$ corresponds to a Mw/Mn range of 2.8 to 3.6.

The especially preferred (LLDPE) copolymers have a density of between about 0.915 to 0.945. The density of the copolymer, at a given melt index level of the copolymer, is primarily regulated by the amount of the comonomer which is copolymerized with the ethylene. The addition of increasing amounts of the comonomers to the copolymers results in a lowering of the density of the copolymer.

The preferred copolymers have an unsaturated group content of ≦1 and preferably ≧0.1 to ≦0.3 C=C/1000 carbon atoms and a n-hexane extractables content (at 50° C.) of less than about 3 and preferably less than 2 weight percent. The preferred materials are made by the Unipol process which is described in Chem. Eng., Dec. 3, 1979, pp. 80-85 which is incorporated by reference.

The compositions of the invention may comprise from 80.0 to 99.9 parts by weight of polyester-carbonate resin and 20-0.1 parts by weight of the linear low density polyolefin, the parts per weight of each is measured per 100 parts of polyester-carbonate and linear low density polyolefin. A preferred range comprises from 92.0 to 98.5 parts by weight of polyester-carbonate and from 1.5 to 8.0 parts by weight of linear low density polyolefin per 100 parts of polyester-carbonate and linear low density polyolefin.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium dioxide, potassium titanate, bentonite, kaolinite and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 1 to about 60 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by stream or air blowing, flame blowing and mechanical pulling. The preferred filaments for reinforcement are made by mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, stable fibers and glass fiber mats are included. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛" to about 1" long, preferably less than ¼" in length. These are called chopped strands. Some of these binding agents are polymers such as polyvinyl acetate, particular polyester resins, polycarbonates, starch, acrylic, melamine or polyvinyl alcohol. Preferably, the composition contains from about 1 to about 50 weight percent of the glass fibers.

Flame retardant amounts of flame retardants may also be utilized in the composition of the invention in amounts of from 0.5-50 parts by weight of the resinous components. Examples of suitable flame retardants may be found in U.S. Pat. Nos. 3,936,400 and 3,940,366 which are incorporated by reference. Other conventional non-reinforcing fillers, antioxidants, extrusion aids, light stabilizers, impact modifiers, foaming agents such as those disclosed in U.S. Pat. No. 4,263,409 and Ger. Offen. No. 2,400,086 which are incorporated by reference and the like may be added to the composition of the invention if desired. The stabilizers may include phosphite and/or epoxide stabilizers.

The manner of preparing the inventive composition is conventional. Preferably, each ingredient is added as part of a blend premix and the latter is mixed, e.g., by passage through an extruder, or by fluxing on a mill at a temperature dependent on the particular composition. The mixed composition may be cooled and cut up into molding granules and molded into the desired shape.

DESCRIPTION OF THE PREFERRED EMBODIMENTS

The following examples illustrate the invention. All parts are by weight.

PROCEDURE A

A series of compositions was prepared from a polyester-carbonate that had an I.V. of about 0.5 dl/g as measured in methylene chloride at 30° C. that was prepared as follows: To a reactor vessel is added 16 liters of methylene chloride, 8 liters of water, 1906 grams (8.36 moles) of bisphenol A, 24 millimeters of triethylamine, 3.4 grams of sodium gluconate, and 65 grams of paratertiary-butylphenol chain terminator. At a pH of between about 9-10.5, 1089.6 grams (5.37 moles) of a mixture of 15% by weight of isophthaloyl dichloride and 85% by weight of terephthaloyl dichloride in 2 liters of methylene chloride are added over a 10 minute interval while controlling the pH at about 9-10.5 with 35% aqueous caustic. After the addition of the diacid chloride mixture, phosgene is added at a rate of 36 grams per minute for 12 minutes while controlling the pH at about 10-11 with 35% aqueous caustic. The polymer mixture is diluted with 2 liters of methylene chloride and the brine phase is separated. The resulting polymer phase is washed once with 0.1N HCl and three times with water and is then recovered by high steam precipitation to yield a white powder.

A specific polymer has molar ratios of dihydroxydiaryl units to benzene dicarboxylate units to carbonate units of about 1:0.6–0.75:0.40–0.25 and a molar ratio of terephthalate units of about 8.5:1.5.

EXAMPLE 1

A linear low density polyethylene (LLDPE) made with butene-1; and 0.03 parts by weight of composition of bis(2,4-di-tert- butylphenyl) pentaerythritol diphosphite; and 0.1 parts by weight of composition of 3,4-epoxycyclohexylmethyl-3, 4-epoxycyclohexane-carboxylate. The compositions had varying amounts of the polyester-carbonate and the linear low density polyethylene as set forth in Table 1. The date for the S-tensile impact strength was obtained by immersion of standard size test bars that were molded from the compositions of the invention. All of the amounts are in parts by weight.

TABLE 1

| Sample | Polyester-Carbonate | LLDPE* |
| --- | --- | --- |
| A* | 99.87 | 0 |
| B | 98.87 | 1 (Escorene LPX-12) |

TABLE 1-continued

| Sample | Polyester-Carbonate | LLDPE* |
|---|---|---|
| C | 97.87 | 2 (Escorene LPX-12) |
| D | 95.87 | 4 (Escorene LPX-12) |
| E | 98.87 | 1 (Escorene LPX-1) |
| F | 97.87 | 2 (Escorene LPX-1) |
| G | 95.87 | 4 (Escorene LPX-1) |

*All tested LLDPE in Table were obtained from Exxon

These compositions had the following S-tensile impact strengths after being immersed in water at 82° C., results reported in ft.lbs.

|   | 0 DAYS | 3 DAYS | 7 DAYS | 14 DAYS |
|---|---|---|---|---|
| A* | 202.1 | 64.1 | 62.1 | 57.1 |
| B | 185.1 | 178.6 | 135.01 | 134.6 |
| C | 286.2 | 266.5 | 213 | 154.6 |
| D | 207.0 | 227.4 | 293 | 236.3 |
| E | 281.8 | 264.7 | 258 | 179.5 |
| F | 315.3 | 317.1 | 376 | 273.2 |
| G | 363.5 | 244.1 | 288 | 291.4 |

*Control

The compositions, A–G, were evaluated for retention of impact strength in the unnotched Izod impact test, $\frac{1}{8}''$ samples, after treatment at 250° F. in a steam autoclave for a certain time period. The results reported below in ft.lbs. with the superscripts refering to the percent ductility.

|   | 0 HOURS | 48 HOURS | 93 HOURS | 142 HOURS |
|---|---|---|---|---|
| A* | $>39^{100}$ | $9.0^{0}$ | $1.2^{0}$ | $.81^{0}$ |
| B | $>40^{100}$ | $20.1^{0}$ | $15.3^{0}$ | $.66^{0}$ |
| C | $>40^{100}$ | $>38.2^{100}$ | $30.0^{0}$ | $1.6^{0}$ |
| D | $>40^{100}$ | $>37.0^{100}$ | $>40.3^{100}$ | $3.1^{0}$ |
| E | $>40^{100}$ | $>37.0^{100}$ | $21.5^{0}$ | $1.3^{0}$ |
| F | $>40^{100}$ | $>37.1^{60}$ | $>39.7^{100}$ | $1.3^{0}$ |
| G | $>40^{100}$ | $>39.5^{100}$ | $>39.7^{100}$ | $1.5^{0}$ |

*Control

This data shows that the LLDPE has a dramatic effect on the ability of the polyester-carbonate to retain impact strength when immersed in water at 82° C. or autoclaved at 250° F.

Obviously, other modifications and variations of the present invention are possible in light of the above teachings. It is, therefore, to be understood that changes may be made in the particular embodiment of the invention described which are within the full intended scope of the invention as defined by the appended claims.

What is claimed is:

1. A composition comprising an aromatic copolyester-carbonate having from about 25 to 90 mole percent ester units in admixture with a hydrolytic stabilizing effective amount of a linear low density polyolefin having a density of from about 0.89 to 0.96 gm/cc.

2. A composition in accordance with claim 1 wherein the linear low density polyolefin is a polyethylene.

3. A composition in accordance with claim 2 wherein the polyethylene is from about 0.1 to 20 weight percent of the polyethylene and aromatic copolyester-carbonate.

4. A composition in accordance with claim 2 wherein the linear low density polyethylene has a density of from about 0.915 to 0.945.

5. A composition in accordance with claim 4 wherein the linear low density polyethylene is formed from ethylene and a $C_4$ to $C_8$ alpha olefin.

6. A composition in accordance with claim 5 wherein the aromatic copolyester is comprised from a dihydric phenol and isophthalic acid or isophthalic acid derivative.

7. A composition in accordance with claim 6 wherein the aromatic copolyester-carbonate is also derived from a small quantity of terephthalic acid.

8. A composition in accordance with claim 6 wherein the dihydric phenol is bisphenol A.

9. A composition in accordance with claim 7 wherein the isophthalic and terephthalic units are both present in the aromatic copolyester-carbonate, the terephthalate to isophthalate ratio being from about 9:1 to 0.2:9.8.

* * * * *